Sept. 5, 1939.  W. B. EWING  2,172,137
TUBULAR METAL RAILING STRUCTURE
Filed April 16, 1937
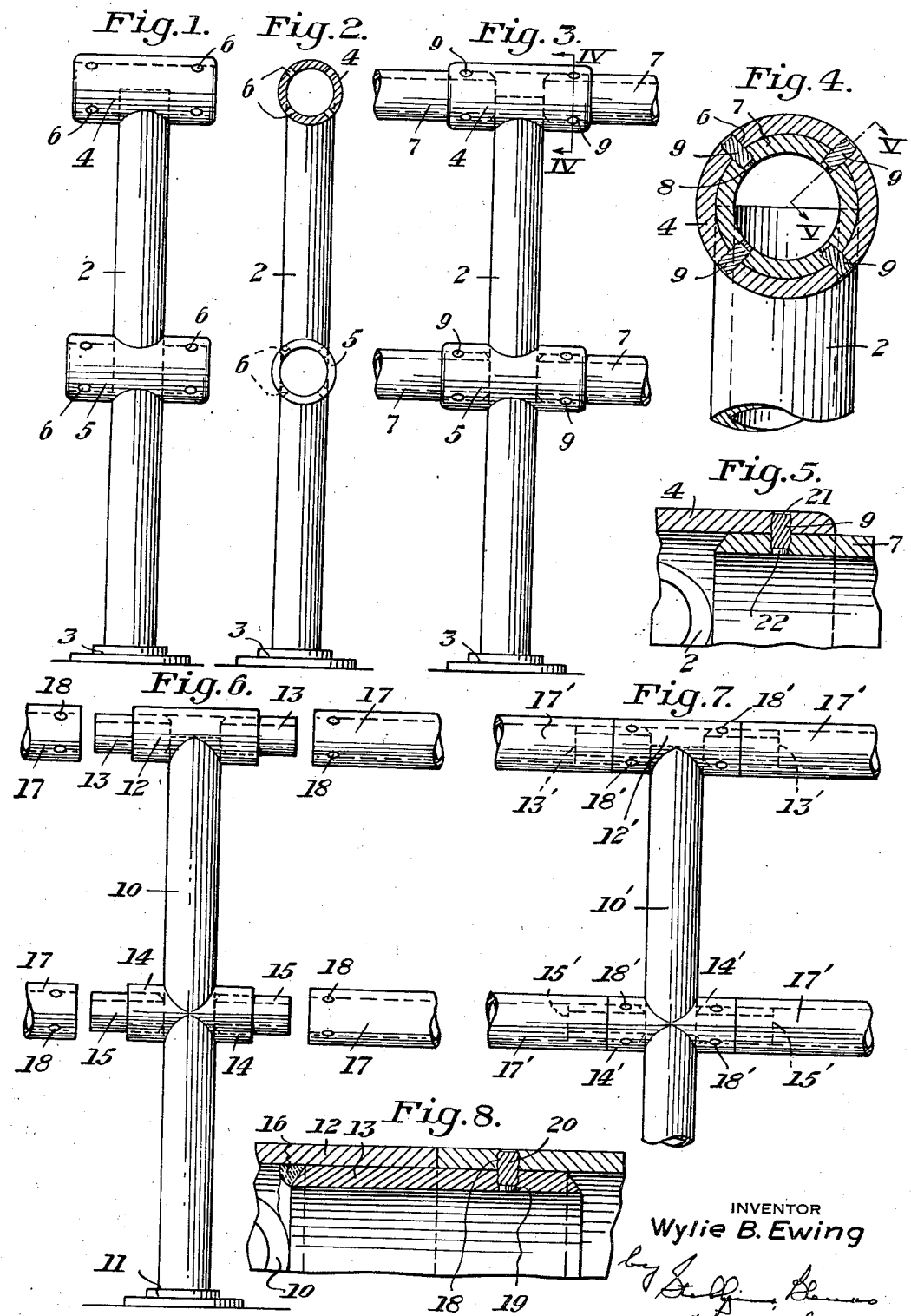
INVENTOR
Wylie B. Ewing Patented Sept. 5, 1939

2,172,137

UNITED STATES PATENT OFFICE 2,172,137

TUBULAR METAL RAILING STRUCTURE

Wylie B. Ewing, Wheeling, W. Va., assignor, by mesne assignments, to Vulcan Rail and Construction Company, Maspeth, N. Y., a corporation of New York Application April 16, 1937, Serial No. 137,258

2 Claims. (Cl. 29—148.2)

The present invention relates to composite structures and the manufacture thereof. It relates especially to tubular metal railing structures, and still more particularly to such structures comprising at least one member whose surface is substantially stable at atmospheric temperatures but not at certain relatively high temperatures such, for example, as welding temperatures.

I have found the invention to be especially applicable to the manufacture of tubular metal railing, although the broader features of the invention are useful in many other ways and I shall describe the invention as applied to the manufacture of railing made out of metal pipe or tubing.

Tubular metal railing is becoming very popular, especially since the introduction of certain improvements in the art of fabricating such railing which form the subject-matter of copending applications. I am able to produce at low cost highly satisfactory tubular metal railing. Component parts of such railing are welded together. For certain purposes such railing is desired to be galvanized, and this presents a problem in fabrication. After the component parts of the railing have been welded together the structure is too large to be dipped in a galvanizing tank of practical size; moreover, difficult problems incident to dipping technique arise. Consequently the practice heretofore has been to galvanize separately component parts of the railing and then weld them together. Moreover, this procedure has been considered preferable for other reasons, and the standard practice has been to weld together the component parts of the railing in the field except in special cases. However, the welding heat adversely affects the galvanized pipe or tubing. It changes the zinc in the galvanized coating to zinc oxide, which prevents a good weld. Also, the welding burns the zinc coating off the pipe adjacent the weld so that the weld itself and the adjacent area are uncoated and hence not corrosion resistant as are the galvanized portions of the railing. In fact, it has been found practically impossible to get a satisfactory weld using galvanized pipe, and if such pipe is to be welded the galvanized coating at and adjacent the weld should be removed before commencing the welding operation. But this has the same disadvantage that in the ultimate welded structure the weld itself and the area adjacent the weld are uncoated and hence subject to corrosion.

I have found that the difficulties mentioned above can be overcome by connecting together component railing parts at a temperature below welding temperature and preferably at atmospheric temperature. I preferably employ connecting means passing at least partially through each of the members being connected, the connecting means being disposed substantially entirely within the confines of the structure. This is important, as commercial tubular railing should not have projections such as rivet heads, bolt heads, nuts, etc., projecting from the surface of the pipe.

While other equivalent means may be employed, I prefer to use drive screws in connecting together portions of galvanized tubular railing, as these are found highly satisfactory from all standpoints. A drive screw is a substantially cylindrical headless screw which is adapted to be driven with a hammer similarly to a nail, although drive screws are so designed that they may be driven into or through metal members which are initially at least partially punctured to receive them. As drive screws are headless they may be driven in so as to be disposed substantially entirely within the confines of the railing or other structure. It is preferable, as will presently be described, to provide railing members which are to be connected by a drive screw with openings to receive the drive screw, the diameter of such openings being substantially equal to the diameter of the body of the drive screw, whereby the threads of the drive screw bite into the metal at the periphery of the openings. The drive screws may be applied cold, or at atmospheric temperature, thus obviating any detrimental effect on the galvanized coating as heretofore encountered in the production of welded galvanized railing. A drive screw is preferably driven in from the outside of the railing until its outer surface is substantially flush with the outer surface of the railing. Thus, while the drive screw is disposed substantially entirely within the confines of the railing structure it closes up the hole therein and provides a substantially smooth exterior. Preferably drive screws which are corrosion resistant are employed so that after they are in place they will not corrode and cause rust streaks on the railing. While only that portion of the surface of a drive screw which is exposed need necessarily be corrosion resistant, it is preferable to employ drive screws which are corrosion resistant throughout their entire surface. An example of such a drive screw is one which is cadmium coated.

Other details, objects and advantages of the invention will become apparent as the following description of certain present preferred embodiments thereof and certain present preferred methods of practicing the same proceeds.

In the accompanying drawing I have shown certain present preferred embodiments of the invention and have illustrated certain present preferred methods of practicing the same, wherein Figure 1 is a face view of a post with connectors welded thereto for use in making tubular metal railing of the connector type;

Figure 2 is another view of the structure shown in Figure 1 taken at right angles to Figure 1 and with the upper connector shown in vertical transverse cross section through the openings provided therein for the reception of fastening means;

Figure 3 is a view similar to Figure 1 but showing a completed fragment of railing including post, connectors and run pipe;

Figure 4 is an enlarged fragmentary vertical transverse cross-sectional view taken on the line IV—IV of Figure 3;

Figure 5 is a central longitudinal fragmentary cross-sectional view taken on the line V—V of Figure 4;

Figure 6 is a face view of a post with connecting devices welded thereto for use in making tubular metal railing of the flush type, the ends of pieces of run pipe before connection with the post assembly being shown;

Figure 7 is a view similar to Figure 6 but showing a completed fragment of railing including post, connecting devices and run pipe, the form of railing shown in Figure 7 being, however, specifically different from the form shown in Figure 6; and Figure 8 is a central longitudinal fragmentary cross-sectional view similar to Figure 5 but showing the structure of Figure 6 with the run pipe assembled with and fastened to the post assembly.

Referring now more particularly to the drawing, Figures 1 to 5, inclusive, show the fabrication of tubular metal railing of the connector type which employs connectors between the posts and run pipe which are of greater diameter than the posts or run pipe or both. Railing of this type is disclosed and claimed in my copending application Serial No. 751,717, filed November 6, 1934.

In the particular embodiment of the invention shown in Figures 1 to 5, inclusive, the connectors are of greater diameter than both the posts and the run pipe, the posts and run pipe being of equal diameter.

There is provided a length of metal tubing or pipe 2 of such size as to constitute a post of a tubular metal railing. The post 2 is connected at its bottom with a suitable base plate 3 which serves as a foot for the post and maintains it upright. Preferably the post passes through an opening in the base plate 3 and is welded to such plate at the lower or unexposed face thereof. The form of the base plate and the manner of the connection of the post thereto do not constitute the present invention. The base plate may, for example, be such as is disclosed and claimed in my copending application Serial No. 22,237, filed May 18, 1935.

Connectors 4 and 5 are connected with the post 2 at its upper and central portions, respectively. Each of these connectors is a short piece of pipe of greater diameter than the post bored transversely to receive the post and welded to the post interiorly of the structure so that the welding is not visible from without in the finished railing. Each of the connectors has formed therein, as by punching or drilling, adjacent each end thereof one or more openings or holes 6 for the reception of fastening means, as will presently be described. In the illustrated embodiment each of the connectors is provided with a set of four such openings adjacent each end thereof, the openings of each set being equally spaced circumferentially of the connector. The openings 6 may be, and preferably are, formed in the connectors before the connectors are welded to the post, although this may be done afterward if desired.

The post assembly shown in Figure 1 is galvanized, as by dipping it in suitable manner in a tank of spelter. This renders its surface relatively corrosion resistant. The run pipe which is used in formation of the railing is galvanized in similar manner before it is connected with the post assembly. After the post assembly and the run pipe have been galvanized they are assembled by inserting the end of a length of run pipe axially into each end of each of the connectors 4 and 5, as shown in Figure 3. The run pipe is designated by reference numeral 7. Openings 8 for reception of fastening means are provided in the run pipe in alignment with the openings 6 in the connectors, as shown in Figures 4 and 5. The openings in the run pipe may be formed before insertion of the run pipe into the connectors, or they may be formed after such insertion by drilling them through the openings in the connectors. Alternatively, the connectors may be used as templates to mark the ends of the run pipe, whereafter the run pipe may be withdrawn from the connectors and the openings 8 drilled or punched therein, whereafter the ends of the run pipe may be again inserted into the connectors. Both the openings 6 and the openings 8 may be formed either before or after galvanizing, as their formation may be effected at atmospheric temperature and the galvanized coating on the pipe if present at the time of formation of the openings will not be affected except within the area of intersection between the opening and the galvanized surface of the pipe.

When the post assembly and run pipe are assembled as shown in Figure 3 with the openings 6 and 8 in alignment fastening means are passed through said openings to maintain the post assembly and run pipe together. The fastening means should be disposed substantially entirely within the confines of the railing, as railing having outward projections interrupting its cylindrical surface is not commercially desirable. I have found that drive screws 9 as shown in Figures 4 and 5 are admirably suited to the purpose as they do not have enlarged heads as do bolts and rivets, they may be applied at atmospheric temperature and they form a secure connection between the post assembly and the run pipe. The drive screws are substantially cylindrical but externally threaded. They are driven into the aligned openings 6 and 8 from the outside of the structure until the outer end of each drive screw is substantially flush with the outer surface of the railing. Each drive screw is preferably of such length that both of its ends will be substantially flush with the respective outer and inner surfaces of the railing when it is applied. The drive screws are very easy to apply, being driven in with a hammer or other suitable tool. They are of such size relative to the aligned openings 6 and 8 that the threads bite into the metal at the periphery of the openings and the drive screws substantially fill up the openings. The drive screws are preferably corrosion resistant and to this end they may be cadmium coated.

Thus, as will be seen from Figure 4, a structure made as above described will have a substantially smooth unbroken surface which is corrosion resistant. The galvanized surface of the pipe is unimpaired by application of the drive screws. The railing is highly satisfactory from the structural standpoint can be fabricated in an extremely simple way and is of low cost.

Figures 6, 7 and 8 show the fabrication of tubular metal railing of the flush type in which the posts and run pipe are of equal diameter. Railing of this type is disclosed and claimed in my copending application Serial No. 22,236, filed May 18, 1935.

Referring to Figures 6 and 8, there is provided a post 10 connected at its bottom with a base plate 11 and having welded thereto at its upper portion a head 12 and stubs 13 and having welded thereto at its central portion a pair of opposed bosses 14 and stubs 15. The head 12 and the bosses 14 are made of pipe of the same diameter as the post 10 and form exposed portions of the finished railing. The stubs 13 and 15 are welded within the head 12 and the bosses 14, respectively, and the head and bosses are welded to the post. The welding is effected internally of the structure so as not to be visible from without in the finished railing. In Figure 8 one of the stubs 13 is shown as being welded to the head 12 by welding material 16 disposed within the head. The stub is also shown as abutting the upper portion of the post 10 and the welding material 16 may also connect with the post, thereby not only holding the head 12 and the stub 13 in assembly, but maintaining such assembly in place with respect to the post.

The post assembly above described is preferably galvanized similarly to the post assembly shown in Figures 1 and 2. Also the lengths of run pipe 17 are preferably separately galvanized. The run pipe is of the same diameter as the post 10, the head 12 and the bosses 14. The lengths of run pipe are adapted to be slid over the stubs 15 into contact with the ends of the head 12 and bosses 14, respectively.

Each run pipe 17 has adjacent its end one or more openings 18 formed therethrough, as by punching or drilling, the structure shown in Figures 6 and 8 being such that each run pipe has adjacent each end thereof four openings 18 equally spaced circumferentially of the run pipe. The galvanized run pipe is assembled with the galvanized post assembly by sliding the end of each run pipe over one of the stubs 13 or 15 as the case may be. As shown in Figure 8, the stubs are of such size as to fit snugly within the run pipe as well as within the head or boss. This serves to guide and positively support the run pipe.

Openings 19 are provided in each of the stubs in alignment with the openings 18 in the run pipe. As explained above in connection with the form of structure shown in Figures 1 to 5, inclusive, the openings 18 and 19 may be formed before or after galvanizing, although I find it preferable to form the openings 19 using the openings 18 as a guide after the run pipe has been slid over the stubs in contact with the head 12 or the bosses 14 as the case may be. The same general technique as above described with respect to the form of Figures 1 to 5, inclusive, is followed in forming the openings in the respective members and driving in the drive screws, one of which is indicated at 20 in Figure 8.

The structure of Figure 7 differs from that of Figure 6 in that the stubs 13' and 15' instead of forming a part of the initial welded post assembly which is galvanized as an assembly are initially welded within the ends of the lengths of run pipe 17'. Openings 18' are formed in the head 12' and the bosses 14', respectively. The head 12' and the bosses 14' are welded directly to the post 10' internally of the structure. The post assembly comprising the post 10' with the head 12' and the bosses 14' welded thereto and having, if desired, a base plate (not shown) is galvanized as a unit, and each length of run pipe 17' with one of the stubs 13' or 15' welded to its end is separately galvanized.

In the form of Figure 7 each of the stubs 13' and 15' projects beyond the end of the length of run pipe into which it is welded and when the galvanized run pipe is assembled with the galvanized post assembly the stubs are inserted into the head 12' and bosses 14' provided with the openings 18'. The remainder of the fabrication of the railing is effected in substantially the same manner as above described, drive screws being employed as in the other forms.

It should be remarked that the particular form of drive screw shown in the drawings is not per se of my invention. Such form of drive screw has at its upper portion, viewing, for example, Figure 5, a short section 21 of its length which is not threaded and has at its lower portion a somewhat longer section 22 of its length which is not threaded. The threads project outwardly beyond the peripheries of the portions 21 and 22 so that the portion 22 serves to assist in starting the drive screw, as such portion can be inserted into an opening large enough to receive it but smaller than the external diameter of the threads. Indeed this is the preferred method of use of the drive screws, the openings therefor being made just large enough to receive the portions 22 of the drive screws so that when the screws are driven in the threads will bite into the metal of the pipe to insure substantially complete filling of the openings therein and also to insure a structurally strong connection. As above explained, the upper portion of each drive screw is preferably disposed substantially flush with the outer surface of the railing as shown.

While I have shown and described certain present prefered embodiments of the invention and certain present preferred methods of practicing the same, it is to be distinctly understood that the invention is not limited thereto but may be otherwise variously embodied and practiced within the scope of the following claims.

I claim:

1. Railing structure comprising a welded railing assembly comprising a post having means for connection with run pipe welded to the post, and a run pipe connected with said means and hence with said welded railing assembly, each of said welded railing assembly and said run pipe being galvanized prior to connection thereof, and a drive screw maintaining said welded railing assembly and said run pipe together, said drive screw being applicable at atmospheric temperatures and passing at least partially through each of said means and said run pipe and being disposed substantially entirely within the confines of the railing structure but having a portion of the surface thereof exposed at a surface of the railing structure, said exposed surface portion of said drive screw being corrosion resistant.

2. The method of making galvanized tubular metal railing comprising interiorly welded connector members to posts, galvanizing said posts and connector members, galvanizing separate run pipes, and assembling said run pipes to said connector members, and thereby to said posts, at atmospheric temperatures, by drive screws passing into said run pipes and connectors and lying substantially entirely within the railing structure.

WYLIE B. EWING.